No. 791,493. PATENTED JUNE 6, 1905.
A. W. PATRICK.
MACHINE FOR TEMPERING GRAIN PRIOR TO GRINDING.
APPLICATION FILED DEC. 31, 1904.

Witnesses:
A. Ben Cornelius
Linnel Gross

Inventor:
Arch W. Patrick
by Eugene Ayres,
Attorney.

No. 791,493. Patented June 6, 1905.

UNITED STATES PATENT OFFICE.

ARCH W. PATRICK, OF COSBY, MISSOURI.

MACHINE FOR TEMPERING GRAIN PRIOR TO GRINDING.

SPECIFICATION forming part of Letters Patent No. 791,493, dated June 6, 1905.

Application filed December 31, 1904. Serial No. 239,204.

*To all whom it may concern:*

Be it known that I, ARCH W. PATRICK, a citizen of the United States, residing at Cosby, in the county of Andrew and State of Missouri, have invented certain new and useful Improvements in Machines for Tempering Grain Prior to Grinding; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is to provide a device that will automatically regulate the flow of water or steam used in mills in tempering grain prior to grinding; and I accomplish my object by the mechanism illustrated in the accompanying drawings, in which—

Figure 2:
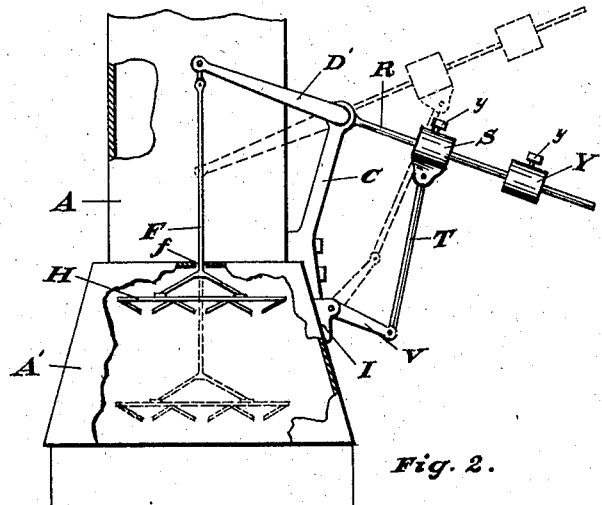
Figure 1:
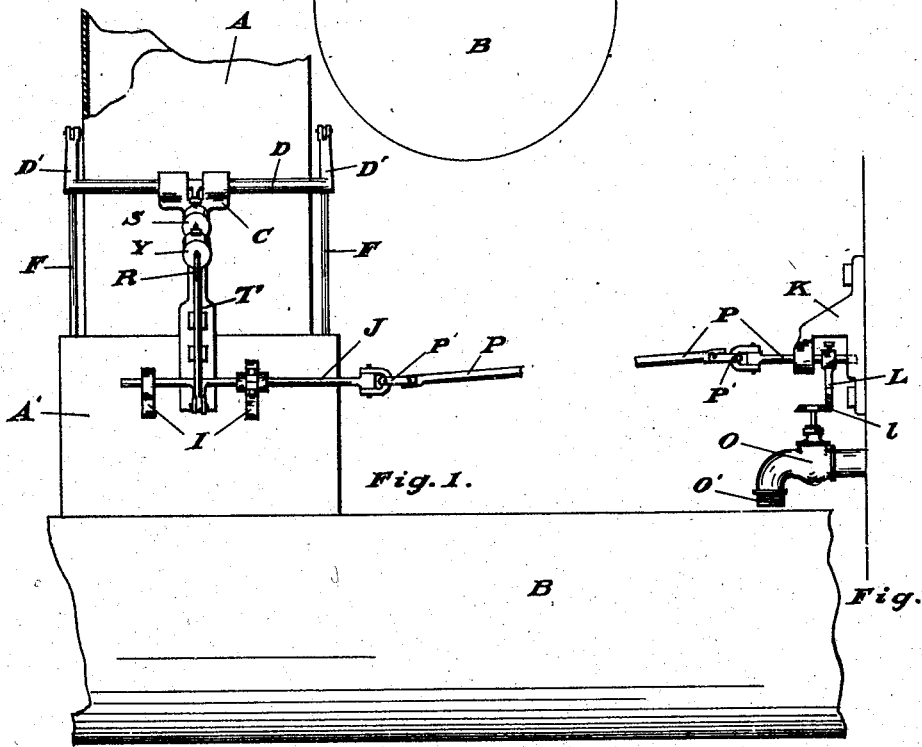
Figure 3:
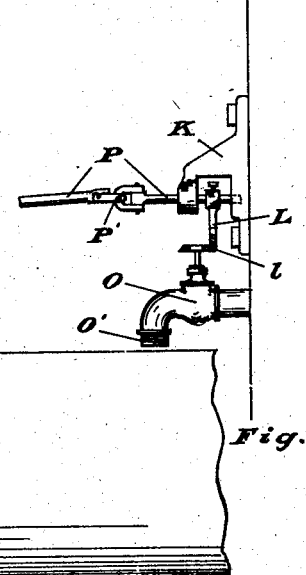

Figure 1 is a front elevation showing the mechanism attached to a grain-conduit with a conveyer beneath, the connecting-pipes broken away. Fig. 2 is a side view of the base broken away, showing a dash-pan within; and Fig. 3 is a view of a bracket, the shaft connection broken away, and a segment and valve connected with a water or steam pipe.

Similar letters refer to similar parts in said figures.

A represents an ordinary grain-conduit having an enlarged base A' and provided with a grain-conveyer B at its base. This base supports a rigidly-set fulcrum-stand C, which carries a rock-shaft D in its upper end. Said shaft carries arms D' D', the arms rigidly gripping the shaft, their opposite ends projecting alongside conduit A. These opposite ends of the arms carry pivotally-connected rods F F, which operate through slots $ff$ in the top of A'. Said rods carry a dash-pan H, adapted to receive the wheat or other grain as it falls and spread and transmit it into conveyer B.

I I are brackets rigidly fastened to base A'. These brackets carry a half-turn shaft J.

K is a bracket suited to attach to a barrel or other reservoir for water or a steam-pipe.

L is a segment provided with cogs $l\ l$.

O is a valve whose cogs mesh with those on the segment. It is adapted to regulate the flow of water or steam into pipe O', which pipe is adapted to empty into conveyer B. Connection is made between shaft J and said segment by means of pipes P P and knuckle-joints P' P'. A lever R grips shaft D midway between its ends.

S is an adjustable balance-weight carried by lever R, to which an adjustable lever-rod T at its upper end is pivotally attached, its lower end having pivotal connection with the outer end of adjusting-lever V. The inner end of said lever V is rigidly fastened to said half-turn shaft J.

Y is an adjustable balance-weight adapted to slide at the outer end of lever R, both it and weight S being provided with set-screws $y\ y$ to regulate their position on said lever, so as to equalize the flow of grain and of water or steam to suit the operator. It will be readily seen that when grain is not passing through the conduit and pressing down on dash-pan H said dash-pan will be at the top of base A' pressed up to the grain-outlet in the bottom of the conduit, as shown in Fig. 2, and that it will be held in that position until the weight of the grain descending on the dash-pan counterbalances that of the adjustable balance-weights on the lever. The dash-pan rods and balance-weights will then be carried into a position similar to that shown by dotted lines in said Fig. 2; but when relieved from the weight of grain it will again ascend to its original position.

Simultaneously with the descent of the dash-pan and the elevation of lever R and its balance-weights shaft J by reason of adjustable rod T and lever V being drawn to the positions shown by the dotted lines in Fig. 2 is revolved a half-turn with its connecting-pipes P P and knuckle-joints P' P' and segment L, the segment-cogs $l\ l$ revolving the stem of valve O until the valve is opened and the water or steam passes through pipe O' into conveyer B for tempering the grain. As the dash-pan passes up to its normal position and the outer end of lever R, adjustable rod T, and shaft-lever V are carried down shaft J is automatically revolved back to its normal position, the movement closing the valve and stopping the flow of water or escape of steam until another descent of grain secures the flow of water or steam necessary for moistening.

The drawings illustrate the mechanism with but one fulcrum-standard; but two can be used, and the form of the conduit and the position of the conveyer can be adjusted to the operating mechanism as circumstances may demand without altering the scope of the invention. If preferred, a pivot-joint bearing for pivoting shaft D on the fulcrum-standard may be used.

What I claim, and desire to secure by Letters Patent, is—

In a device for automatically tempering grain before grinding the combination with the necessary housing for a dash-pan, a fulcrum-standard, a rock-shaft supported by said standard, the arms carried by said shaft and the rods supporting a dash-pan, of a lever rigidly attached to said shaft, and the adjustable weights thereon a half-turn shaft supported vertically below said rock-shaft, an adjustment-lever rigidly attached to said half-turn shaft, an adjustable rod carried by said rock-shaft lever and having pivotal connection with said half-turn-shaft adjustment-lever, a segment provided with cogs, a valve the cogs of which mesh with the segment-cogs, and the connecting mechanism between said segment and the half-turn shaft, substantially as described and shown.

In testimony whereof I affix my signature in presence of two witnesses.

ARCH W. PATRICK.

Witnesses:
 WM. B. SNYDER,
 J. F. HATTEN.